(12) United States Patent
Matsumura

(10) Patent No.: US 9,548,824 B2
(45) Date of Patent: Jan. 17, 2017

(54) RECEIVER CIRCUIT

(71) Applicant: FUJITSU LIMITED, Kawasaki-shi, Kanagawa (JP)

(72) Inventor: Hiroshi Matsumura, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/003,041

(22) Filed: Jan. 21, 2016

(65) Prior Publication Data

US 2016/0269131 A1    Sep. 15, 2016

(30) Foreign Application Priority Data

Mar. 10, 2015    (JP) ................... 2015-047365

(51) Int. Cl.
*H04B 17/00*    (2015.01)
*H04B 17/21*    (2015.01)
*H04B 1/16*    (2006.01)
*H04W 52/02*    (2009.01)

(52) U.S. Cl.
CPC ............... *H04B 17/21* (2015.01); *H04B 1/16* (2013.01); *H04W 52/02* (2013.01)

(58) Field of Classification Search
CPC ...................................... H04B 17/21
USPC ...................................... 455/226.1
See application file for complete search history.

(56) References Cited

U.S. PATENT DOCUMENTS 4,146,328 A * 3/1979 Hullein ............... G01S 17/36
342/127
2011/0150063 A1    6/2011 Suzuki

FOREIGN PATENT DOCUMENTS

JP    2011-130174 A1    6/2011

* cited by examiner

*Primary Examiner* — Sanh Phu
(74) *Attorney, Agent, or Firm* — Kratz, Quintos & Hanson, LLP

(57) ABSTRACT

A receiver circuit includes: a local signal generation circuit that generates a local signal; and a test signal generation circuit that generates a test signal having a frequency close to a frequency of the local signal, wherein the test signal generation circuit includes an oscillator that generates the test signal, a mixer that mixes the local signal with an output of the oscillator to generate a low-frequency signal which is a difference signal between the local signal and the output of the oscillator, a phase detector that detects a phase difference between the low-frequency signal output by the mixer and a reference signal, and a filter that extracts a low-frequency component from an output of the phase detector, and controls an oscillation frequency of the oscillator by using an output of the filter.

3 Claims, 11 Drawing Sheets

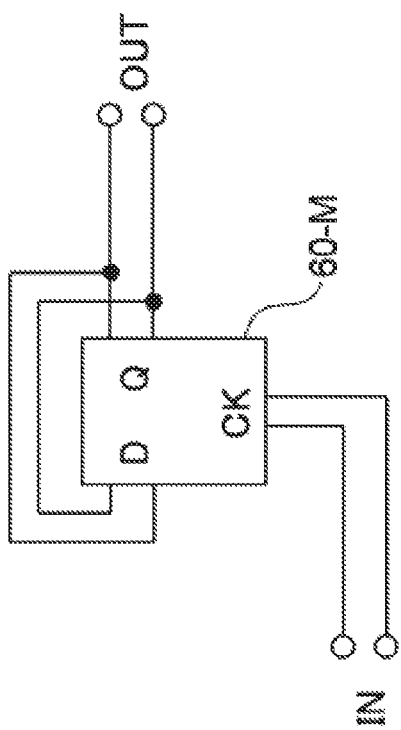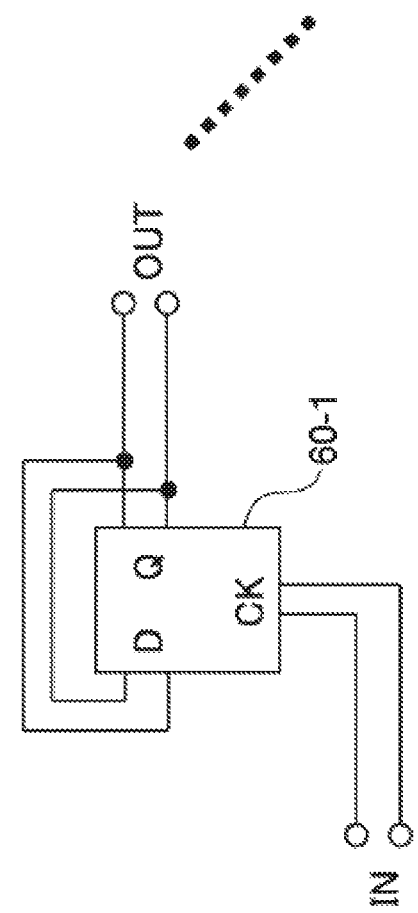
FIG. 8

RECEIVER CIRCUIT

CROSS-REFERENCE TO RELATED APPLICATION

This application is based upon and claims the benefit of priority of the prior Japanese Patent Application No. 2015-047365, filed on Mar. 10, 2015, the entire contents of which are incorporated herein by reference.

FIELD

The embodiments discussed herein are related to a receiver circuit.

BACKGROUND

In wireless devices, reception characteristics are measured at any time, self-correction is performed based on the measured reception characteristics, and thus high performance and high stability are achieved with low power consumption. To do this, a test signal generation circuit that generates a test signal is provided in a receiver circuit of a wireless device, and the generated test signal is supplied to the receiver circuit. A receiver circuit having such a test signal generation circuit is referred to as a receiving built-in-self-test (BIST) circuit.

In a receiver circuit, a local signal having a frequency close to that of an incoming signal is supplied to a mixer together with the incoming signal, a baseband process is performed in the mixer, and a transmission signal component is thereby extracted. In order to inspect reception characteristics, a signal simulating an incoming signal has to be generated separately, and be input from the immediate vicinity of an antenna.

Thus, a test signal generation circuit having a configuration similar to that of a local signal generation circuit that generates a local signal is installed, and a test signal is input from the immediate vicinity of the antenna by using a coupler or the like. The test signal is received by the receiver circuit, and is subjected to a baseband process. This enables measurement of reception gain, a phase change, and so forth.

The local signal generation circuit and the test signal generation circuit are each typically constituted by a phase locked loop (PLL) circuit, and control output frequencies by changing their respective division ratios. For example, a frequency of a signal generated by a voltage-controlled oscillator (VCO) is divided, a phase of this frequency-divided signal is compared with a phase of a reference signal, and a comparison result is fed back. Thus, feedback is applied so that a frequency of the frequency-divided signal becomes equal to a frequency of the reference signal. When a feedback loop is stabilized, an output frequency of the VCO is stabilized.

A frequency of a test signal has to be different from a frequency of a local signal. Hence, a signal source for test signal generation is installed separately from a local signal source, and frequency dividers installed in these respective signal sources have to be controlled so that their respective division ratios differ from each other. For this reason, the test signal generation circuit results in increases in power consumption and circuit area. In particular, in a frequency divider circuit provided in the test signal generation circuit, the conversion from an output frequency to a reference frequency has to be carried out, high-speed operation is demanded, and a significantly large division ratio is also demanded. Thus, the frequency divider circuit provided in the test signal generation circuit is large in size, and also consumes a large amount of power.

The following is a reference document.
[Document 1] Japanese Laid-open Patent Publication No. 2011-130174.

SUMMARY

According to an aspect of the invention, a receiver circuit includes: a local signal generation circuit that generates a local signal; and a test signal generation circuit that generates a test signal having a frequency close to a frequency of the local signal, wherein the test signal generation circuit includes an oscillator that generates the test signal, a mixer that mixes the local signal with an output of the oscillator to generate a low-frequency signal which is a difference signal between the local signal and the output of the oscillator, a phase detector that detects a phase difference between the low-frequency signal output by the mixer and a reference signal, and a filter that extracts a low-frequency component from an output of the phase detector, and controls an oscillation frequency of the oscillator by using an output of the filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A is a circuit diagram of a filter, FIG. 7B is a circuit diagram of a phase detector (PD), and FIG. 7C is a circuit diagram of a mixer;

FIG. 8 illustrates an exemplary circuit of a reference frequency divider circuit;

DESCRIPTION OF EMBODIMENTS

Before a receiver circuit according to each embodiment is described, a typical receiver circuit of a wireless device will be described.

Figure 1:
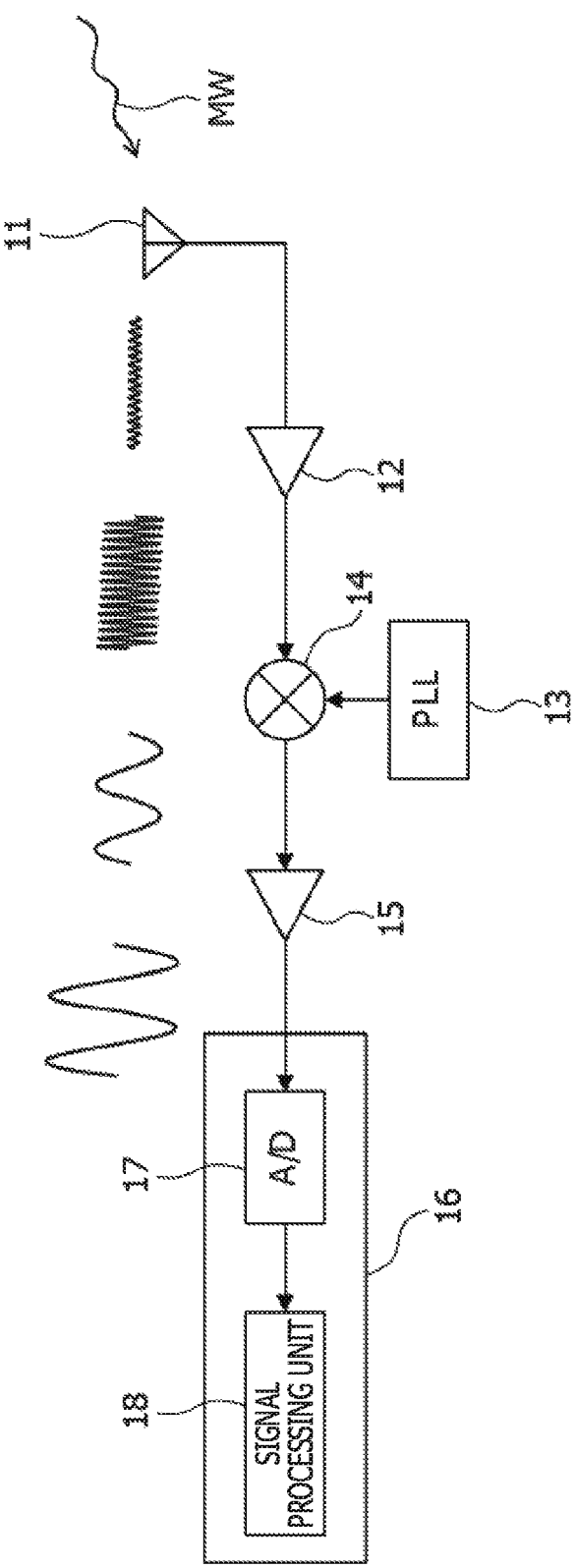
FIG. 1 illustrates a basic configuration of a receiver circuit of a wireless device.

FIG. 1 illustrates a basic configuration of a receiver circuit of a wireless device.

The receiver circuit includes an antenna 11, a linear amplifier (LA) 12, a phase locked loop (PLL) circuit 13, a mixer 14, an intermediate frequency (IF) amplifier 15, and a baseband signal processing circuit 16. The antenna 11 receives a radio signal transmitted from a radio transmitter. Here, the case where a millimeter-wave signal is used as a radio signal will be described as an example. The linear amplifier 12 amplifies a high-frequency signal from the antenna 11. The PLL circuit 13 generates a local signal for reception operation. The mixer 14 mixes the high-frequency signal amplified by the linear amplifier 12 with the local signal to generate an intermediate frequency (IF) signal. The IF amplifier 15 amplifies the IF signal.

The baseband signal processing circuit 16 includes an analog-to-digital (A/D) converter circuit 17, and a signal processing unit 18. The A/D converter circuit 17 converts the IF signal into a digital signal to generate a baseband signal data. The signal processing unit 18 performs a digital process on the baseband signal data to acquire incoming data.

The basic configuration of the receiver circuit illustrated in FIG. 1 is widely known, and further description thereof is therefore omitted. It is noted that a receiver circuit according to each embodiment to be described below is a circuit used as the receiver circuit of the wireless device or the like illustrated in FIG. 1.

As illustrated in FIG. 1, a local signal generated by the PLL circuit 13 is supplied to the mixer 14 for normal reception operation. In order to inspect reception characteristics, a signal simulating an incoming signal has to be generated separately, and be input from the immediate vicinity of the antenna 11. For this reason, typically, a test signal generation circuit equivalent to a PLL circuit that generates a local signal is installed, and a test signal is input from the immediate vicinity of an antenna by using a coupler or the like. The test signal is received by a typical receiver circuit, and is subjected to a baseband process, and reception gain and a phase change may thereby be obtained.

Figure 2:
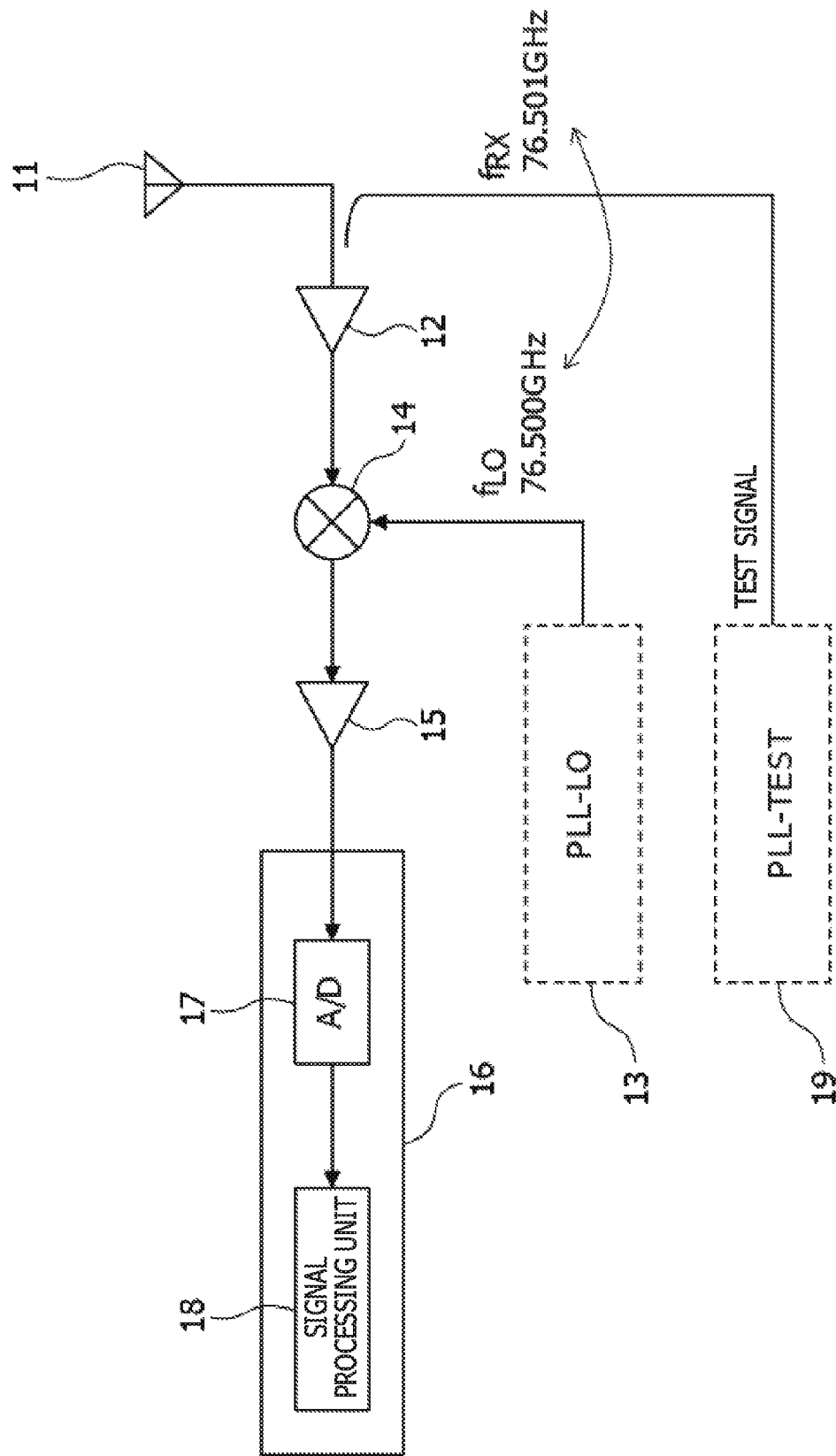
FIG. 2 illustrates a typical configuration of a receiver circuit in which a test signal generation circuit is installed and which enables reception characteristics inspection.

FIG. 2 illustrates a typical configuration of a receiver circuit in which a test signal generation circuit is installed and which enables reception characteristics inspection.

The receiver circuit illustrated in FIG. 2 differs from the receiver circuit illustrated in FIG. 1 in that a test signal generation circuit 19 is provided and a test signal is input from the immediate vicinity of the antenna 11, and the receiver circuit illustrated in FIG. 2 and the receiver circuit illustrated in FIG. 1 are the same in other respects. The test signal generation circuit 19 is constituted by a PLL circuit. Hereinafter, as illustrated in FIG. 2, the PLL circuit (also referred to as a local signal generation circuit) 13 that generates a local signal is represented by PLL-LO, and the test signal generation circuit 19 is represented by PLL-TEST.

Figure 3:
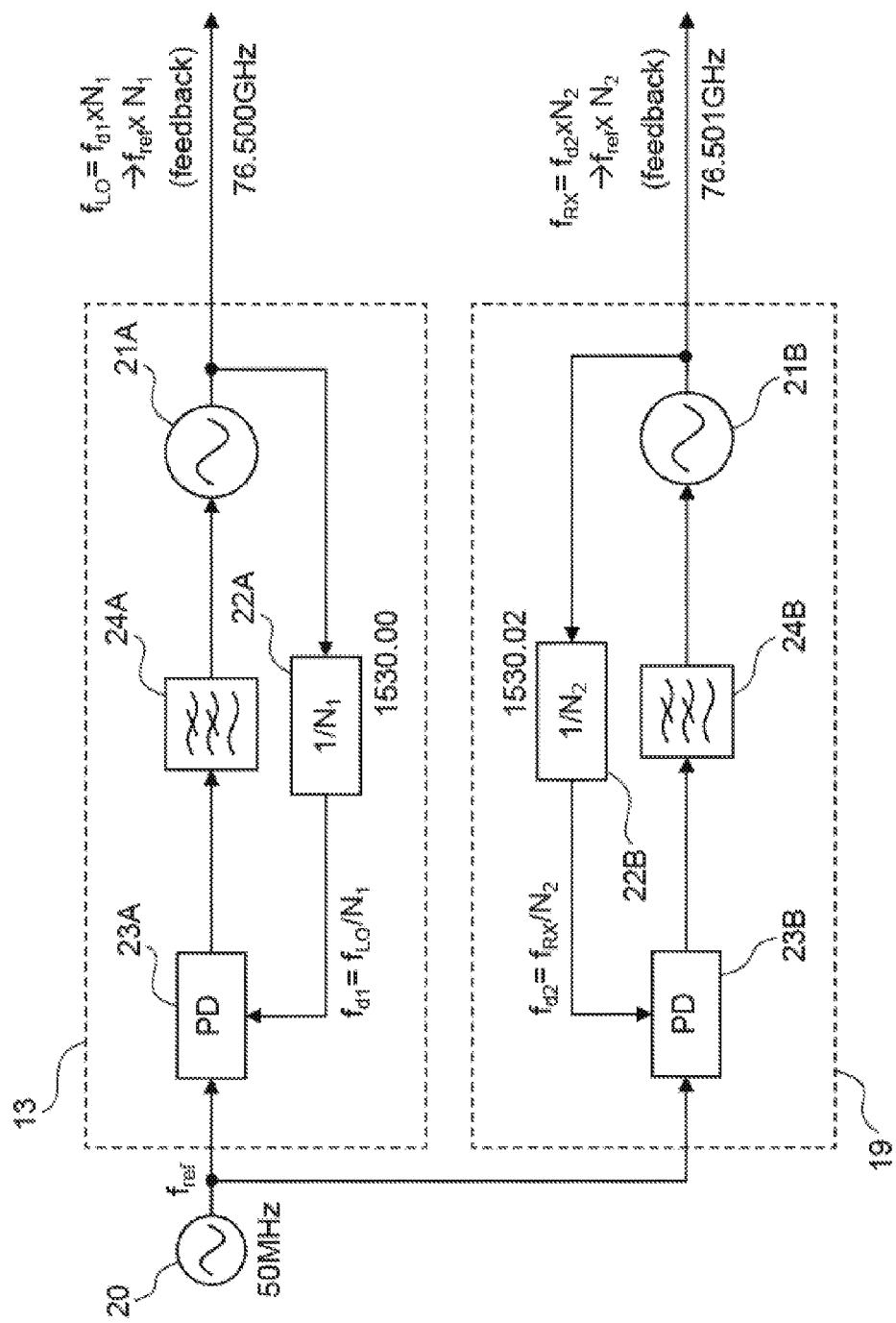
FIG. 3 illustrates a circuit configuration of a local signal generation circuit (PLL-LO) and a test signal generation circuit (PLL-TEST)

FIG. 3 illustrates a circuit configuration of the local signal generation circuit (PLL-LO) 13 and the test signal generation circuit (PLL-TEST) 19.

The PLL-LO 13 includes a voltage-controlled oscillator (VCO) 21A, a frequency divider circuit 22A, a phase detector (PD) 23A, and a filter 24A. The VCO 21A oscillates at a frequency based on a control voltage, and outputs a local signal having a frequency $f_{LO}$. The frequency divider circuit 22A divides a frequency of the local signal output by the VCO 21A by $N_1$, and generates a frequency-divided signal having a frequency of $f_{d1}=f_{LO}/N_1$. A reference signal source 20 outputs an original reference signal Ref having a frequency $f_{ref}$. The PD 23A compares a phase of the original reference signal Ref from the reference signal source 20 with a phase of the frequency-divided signal, and outputs a phase difference signal. The filter 24A extracts a low-frequency component of the phase difference signal to generate a control voltage Vcntl, and outputs the control voltage Vcntl to the VCO 21A. In the PLL-LO 13, feedback is applied so that the frequency of the frequency-divided signal becomes equal to the frequency of the original reference signal. When a feedback loop is stabilized, the frequency $f_{LO}$ of the local signal, which is an oscillation frequency of the VCO 21A, is represented by the following form: $f_{LO}=f_{d1}\times N_1=f_{ref}\times N_1$. In the PLL-LO 13, a frequency of a local signal to be output is controlled by changing a division ratio.

The PLL-TEST 19 includes a VCO 21B, a frequency divider circuit 22B, a PD 23B, and a filter 24B, and forms a feedback loop similar to that in the PLL-LO 13. A frequency $f_{RX}$ of a test signal to be output is represented by the following form: $f_{RX}=f_{d2}\times N_2=f_{ref}\times N_2$. The frequency $f_{LO}$ of the local signal and the frequency $f_{RX}$ of the test signal have to be different from each other although they are close to each other, and thus $N_1=1530.00$ is set, whereas $N_2=1530.02$ is set. In an example illustrated in FIG. 3, because of $f_{ref}=50$ MHz and $N_1=1530.00$, $f_{LO}=50$ MHz × 1530=76.500 GHz is obtained. In contrast to this, because of $N_2=1530.02$, $f_{RX}=50$ MHz×1530.02=76.501 GHz is obtained.

As described above, since a frequency of a test signal has to be different from a frequency of a local signal, a test signal generation circuit is installed separately from a local signal generation circuit, and frequency divider circuits installed in the respective signal generation circuits have to be controlled so that their respective division ratios differ from each other. The local signal generation circuit is a circuit that is large in size and consumes a large amount of power, and thus installation of two such circuits results in increases in power consumption and circuit area. In particular, in a frequency divider circuit, a significantly large division ratio at which the conversion from an output frequency (for example, 80 GHz) to an original reference frequency (for example, 50 MHz) is carried out is demanded, and high-speed operation is also demanded. Thus, the frequency divider circuit is large in size, and consumes a large amount of power.

A receiver circuit according to each embodiment to be described below is used as a receiver circuit of a wireless device, performs self-correction of reception characteristics with a simple circuit configuration, and achieves high performance and high stability with low power consumption.

Figure 4:
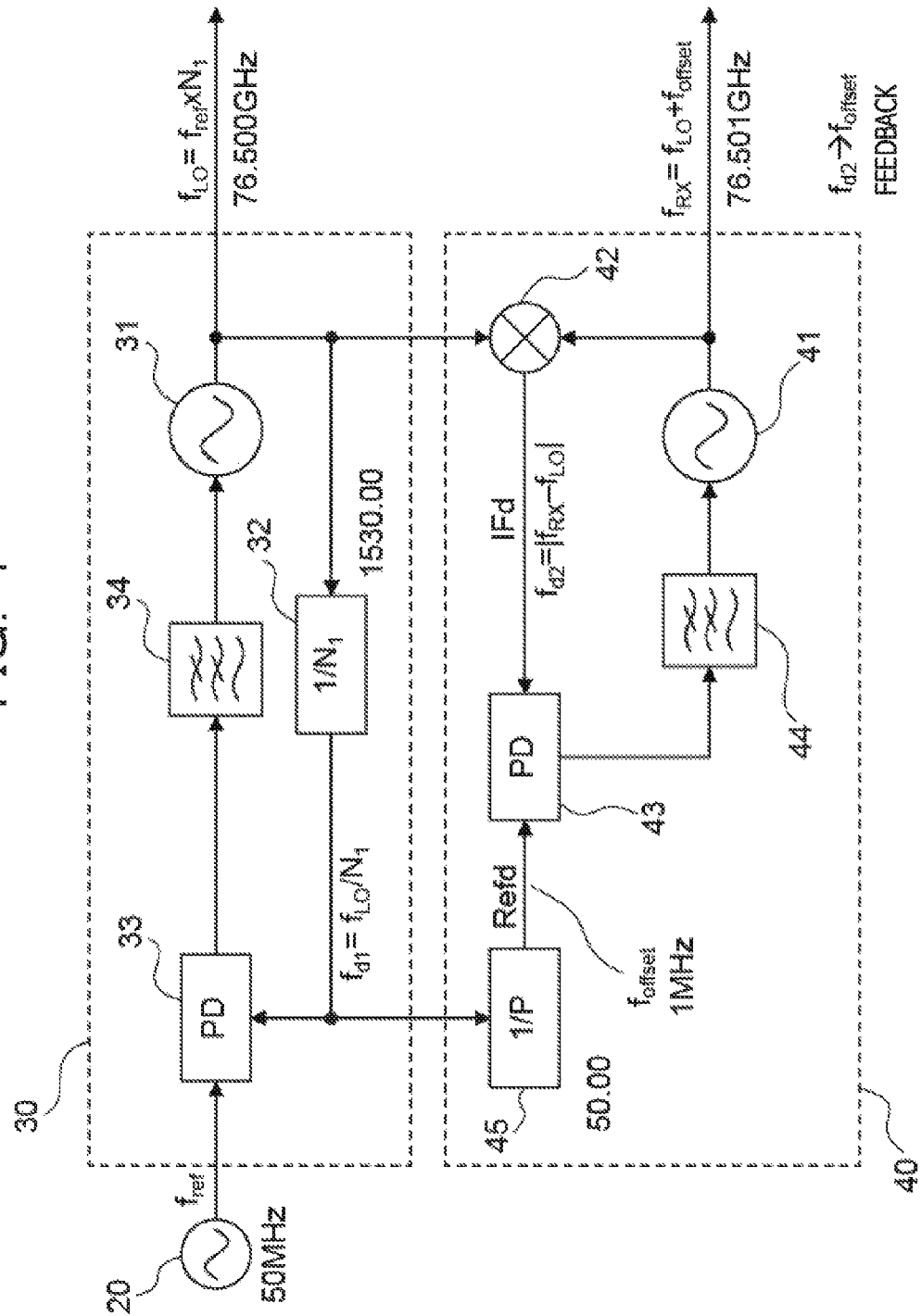
FIG. 4 is a circuit diagram illustrating configurations of a local signal generation circuit (PLL-LO) and a test signal generation circuit (PLL-TEST) in a receiver circuit according to a first embodiment.

FIG. 4 is a circuit diagram illustrating configurations of a local signal generation circuit (PLL-LO) and a test signal generation circuit (PLL-TEST) in a receiver circuit according to a first embodiment.

The receiver circuit according to the first embodiment is used as a receiver circuit of a wireless device like that illustrated in FIG. 2. The receiver circuit according to the first embodiment includes a reference signal source 20, a local signal generation circuit (PLL-LO) 30, and a test signal generation circuit (PLL-TEST) 40. The reference signal source 20 outputs an original reference signal Ref having a frequency $f_{ref}$.

The PLL-LO 30 includes a VCO 31, a frequency divider circuit 32, a phase detector (PD) 33, and a filter 34, changes a division ratio $N_1$ of the frequency divider circuit 32, and thereby changes a frequency $f_{LO}$ of a local signal to be output. In other words, the PLL-LO 30 forms a feedback loop similar to that in the PLL-LO 13 illustrated in FIG. 3.

The PLL-TEST 40 includes a VCO 41, a mixer 42, a phase detector (PD) 43, a filter 44, and a reference frequency divider circuit 45. The VCO 41 oscillates at a frequency based on a control voltage Vcntl, and outputs a test signal having a frequency $f_{RX}$. The mixer 42 mixes the local signal output by the VCO 31 of the PLL-LO 30 with the test signal to generate a low-frequency signal IFd. A frequency $f_{d2}$ of the low-frequency signal IFd is an absolute value of a difference between the frequency $f_{RX}$ of the test signal and the frequency $f_{LO}$ of the local signal. That is, the frequency $f_{d2}$ is represented by the following form: $f_{d2}=|f_{RX}-f_{LO}|$. Assuming $f_{RX}$=76.501 GHz and $f_{LO}$=76.500 GHz, $f_{d2}$=1 MHz is obtained.

The reference frequency divider circuit 45 divides a frequency of a frequency-divided signal output by the frequency divider circuit 32 of the PLL-LO 30 so as to result in a frequency close to the frequency $f_{d2}$ of the low-frequency signal IFd further to generate a reference signal Refd. The frequency of the frequency-divided signal output by the frequency divider circuit 32 here is 50 MHz which is equal to the frequency of the original reference signal, and assuming that a division ratio P of the reference frequency divider circuit 45 is 50.00, a frequency $f_{offset}$ of the reference signal Refd is 1 MHz. Hence, the frequency $f_{offset}$ of the reference signal Refd is a frequency close to the frequency $f_{d2}$ of the low-frequency signal IFd.

The PD 43 compares a phase of the reference signal Refd with a phase of the low-frequency signal IFd, and generates a phase difference signal, which is a comparison result. The filter 44 extracts a low-frequency component from the phase difference signal to generate a control voltage Vcntl, and supplies the control voltage Vcntl to the VCO 41.

In the PLL-TEST 40, the VCO 41, the mixer 42, the PD 43, and the filter 44 constitute a PLL circuit in which the phase of the low-frequency signal IFd is compared with the phase of the reference signal Refd and a comparison result is fed back. In this PLL circuit, feedback is applied so that the frequency $f_{d2}$ of the low-frequency signal IFd becomes equal to the frequency $f_{offset}$ of the reference signal Refd. When a feedback loop is stabilized, the frequency $f_{RX}$ of the test signal output by the VCO 41 becomes equal to a frequency obtained by offsetting the frequency $f_{LO}$ of the local signal by the amount of $f_{offset}$. That is, the frequency $f_{RX}$ is represented by the following form: $f_{RX}=f_{LO}+f_{offset}$. In the PLL-TEST 40, a frequency of a test signal to be output is controlled by changing a division ratio of the reference frequency divider circuit 45.

Figure 5:
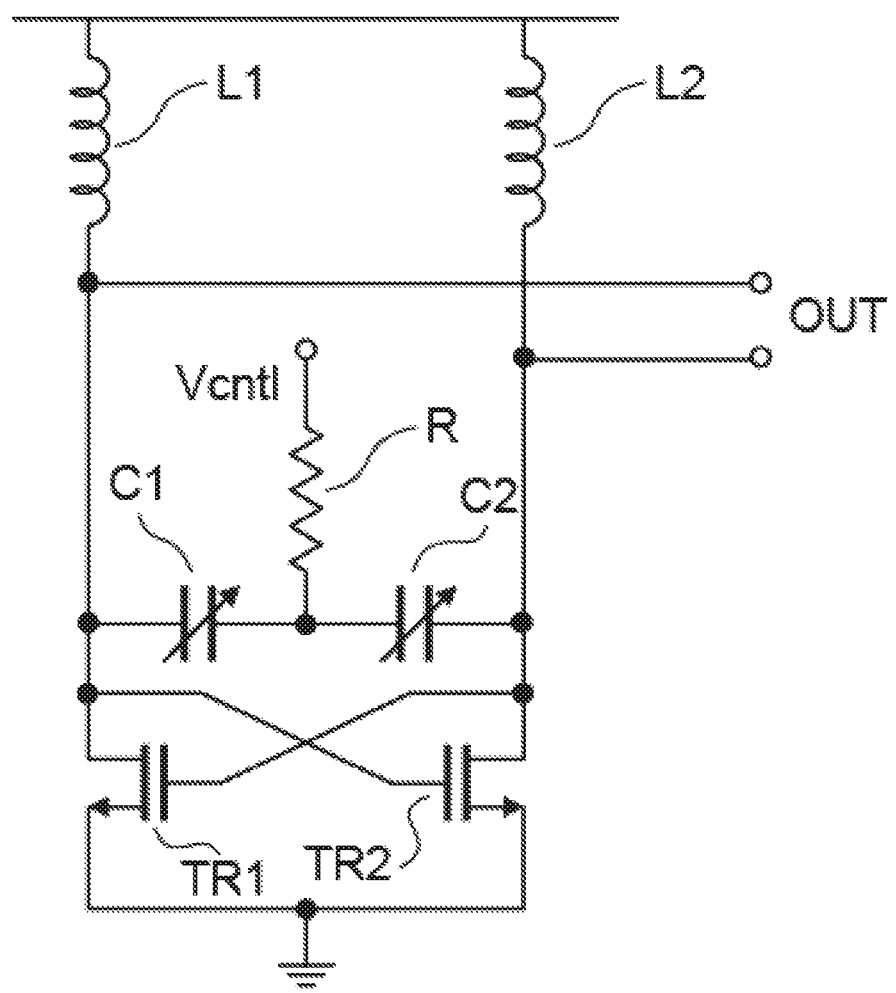
FIG. 5 is a circuit diagram illustrating an example of each of VCOs of the PLL-LO and the PLL-TEST.

FIG. 5 is a circuit diagram illustrating an example of each of the VCO 31 of the PLL-LO 30 and the VCO 41 of the PLL-TEST 40. The voltage-controlled oscillator includes a series circuit including an inductor L1 and a transistor TR1, and a series circuit including an inductor L2 and a transistor TR2, and two series circuits form a differential pair. Sources of the transistors TR1 and TR2 are connected to a common ground, and terminals of the inductors L1 and L2 are connected to a common VCC. Capacitors C1 and C2 are connected in series between a connection node (a drain of the transistor TR1) of the inductor L1 and the transistor TR1 and a connection node (a drain of the transistor TR2) of the inductor L2 and the transistor TR2, and a control voltage Vcntl is supplied to a connection node of the capacitors C1 and C2. Oscillation signals are output from the connection node of the inductor L1 and the transistor TR1 and the connection node of the inductor L2 and the transistor TR2.

The VCO circuit illustrated in FIG. 5 is widely known, and further description thereof is therefore omitted. It is noted that the VCO circuit illustrated in FIG. 5 is an example, and the VCOs used in each embodiment are not limited to this.

Figure 6:
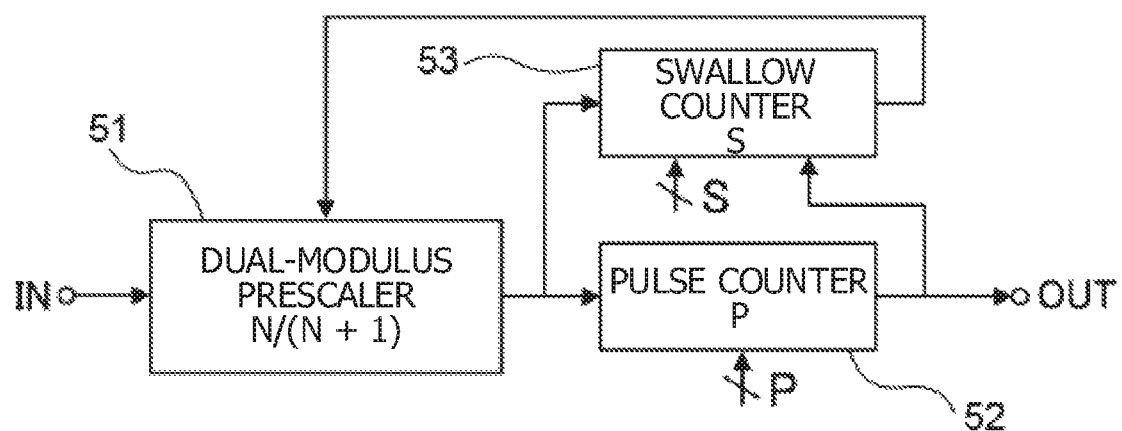
FIG. 6 is a block diagram illustrating an example of a frequency divider circuit of the PLL-LO.

FIG. 6 is a block diagram illustrating an example of the frequency divider circuit 32 of the PLL-LO 30.

The frequency divider circuit 32 is called a pulse-swallow programmable frequency divider, and includes a dual-modulus prescaler 51, a pulse counter 52, and a swallow counter 53. The dual-modulus prescaler 51 is a circuit that generates and outputs a signal having a frequency of 1/N or 1/(N+1) of a frequency of an input signal. Which of frequencies of 1/N and 1/(N+1) of the input signal frequency a signal to be output has is controlled by an output from the swallow counter 53.

The pulse counter 52 is a programmable counter that counts pulses of an input signal received from the dual-modulus prescaler 51, and a count number P is externally set. When the count of the set count number P is reached, the pulse counter 52 changes an output signal (OUT). When the pulse counter 52 completes the count of the count number P, the pulse counter 52 automatically starts the count of a subsequent count number P.

The swallow counter 53 is a programmable counter that counts pulses of an input signal received from the dual-modulus prescaler 51, and a count number S is externally set. When the swallow counter 53 completes the count of the count number S, the swallow counter 53 stops count operation, and the output is kept low. The swallow counter 53 resumes (reloads) count operation in accordance with a change in the output signal of the pulse counter 52.

A total division ratio $N_{tot}$ obtained in the frequency divider circuit 32 illustrated in FIG. 6 is represented by the following form: $N_{tot}=N \cdot P+S$. Thus, in the frequency divider circuit 32, a desired division ratio is obtained by appropriately setting N, P, and S.

For example, assume that N=16 and N+1=17 are set in the dual-modulus prescaler 51, the pulse counter 52 is a 7-bit programmable counter, and the swallow counter 53 is a 4-bit programmable counter. Assuming that the count number P set in the pulse counter 52 is represented by P=96 and the count number S set in the swallow counter 53 is represented by S=4, the total division ratio $N_{tot}=16 \cdot 96+4=1540$ is obtained. When the frequency $f_{ref}$ of the original reference signal Ref is represented by $f_{ref}$=50 MHz, $f_{LO}=N_{tot} \cdot f_{ref}=1540 \times 50$ MHz=77.000 GHz is obtained.

The frequency divider circuit illustrated in FIG. 6 is widely known, and further description thereof is therefore omitted. It is noted that the frequency divider circuit illustrated in FIG. 6 is an example, and the frequency divider circuit used in each embodiment is not limited to this.

Figure 7A:
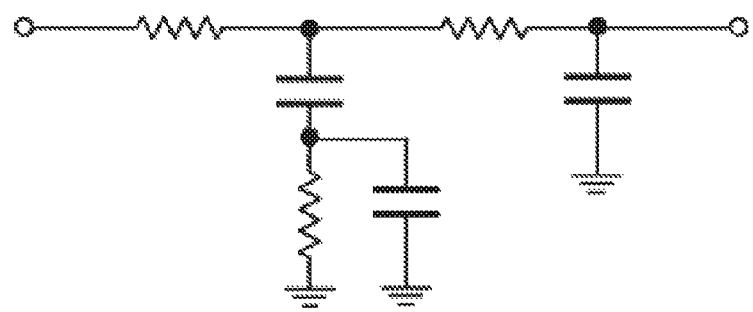
FIGS. 7A to 7C are circuit diagrams of other circuit components.
Figure 7B:
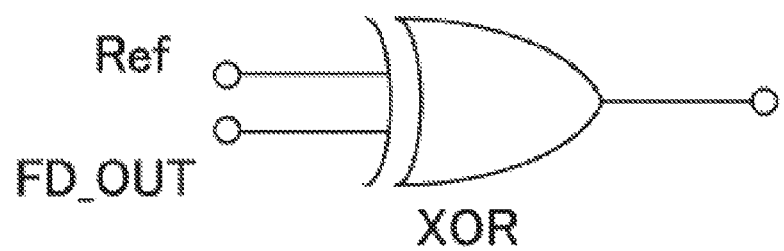
Figure 7C:
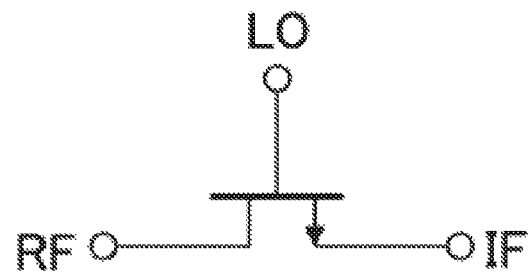

FIGS. 7A to 7C are circuit diagrams of other circuit components, FIG. 7A is a circuit diagram of each of the filters 34 and 44, FIG. 7B is a circuit diagram of each of the phase detectors (PDs) 33 and 43, and FIG. 7C is a circuit diagram of the mixer 42.

The filter illustrated in FIG. 7A is a third-order loop filter including combinations of resistors and capacitors. FIG. 7B illustrates an exclusive OR (XOR) logic circuit that is generally widely used as a simple PD, a reference signal (or an original reference signal) is input to an input Ref which is one input of the XOR logic circuit, and a low-frequency signal is input to an input FD_OUT which is the other input of the XOR logic circuit. FIG. 7C illustrates a resistive mixer circuit in which a transistor which does not supply power is used as a nonlinear resistor. When a local signal LO and a test signal RF are respectively supplied to a gate of the transistor and one controlled terminal, a low-frequency signal IF subjected to frequency conversion by the nonlinearity of the resistor is obtained from the other controlled terminal.

The circuits illustrated in FIGS. 7A to 7C are widely known, and further description thereof is therefore omitted. It is noted that the circuits illustrated in FIGS. 7A to 7C are examples, and the filters, the phase detectors (PDs), and the mixer which are used in each embodiment are not limited to these.

FIG. 8 illustrates an exemplary circuit of the reference frequency divider circuit 45.

The reference frequency divider circuit 45 illustrated in FIG. 8 is a frequency divider circuit constituted by M stages of divide-by-two frequency dividers 60-1 to 60-M which are connected in series. For example, connection of six stages results in a division ratio of 64, and thus a frequency of 50 MHz of an input is divided down to a frequency of 0.78 MHz. A signal to be input to the reference frequency divider circuit 45 is a signal of 50 MHz, and the reference frequency divider circuit 45 is a lower-speed circuit than the frequency divider circuit 32, and also includes a small number of stages.

The frequency divider circuit illustrated in FIG. 8 is widely known, and further description thereof is therefore omitted. It is noted that the frequency divider circuit illustrated in FIG. 8 is an example, and the reference frequency divider circuit 45 used in each embodiment is not limited to this.

As described above, in contrast to the typical circuit illustrated in FIG. 3, the test signal generation circuit (PLL-TEST) 40 in the receiver circuit according to the first embodiment does not include a high-speed frequency divider circuit, and newly includes the mixer 42 and the reference frequency divider circuit 45. Thus, the high-speed frequency divider circuit 22B used in the circuit illustrated in FIG. 3 does not have to be included. The mixer 42 is a circuit whose power consumption is zero if a resistive mixer is used, and the reference frequency divider circuit 45 is a low-speed frequency divider circuit whose operation speed is such a low speed that the conversion from 50 MHz to 1 MHz is carried out. Thus, power consumption in this case is smaller than that in the case where the high-speed frequency divider circuit is provided.

Figure 9:
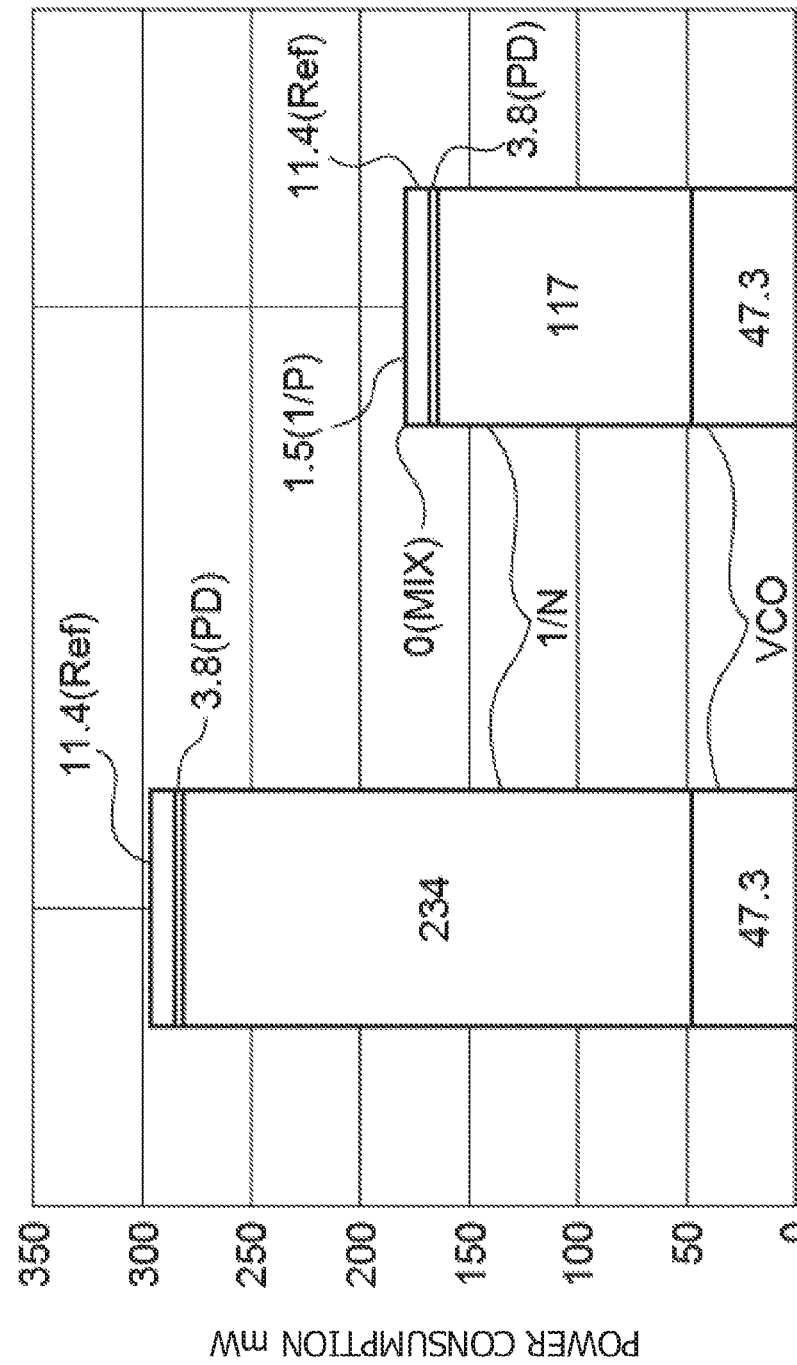
FIG. 9 illustrates constituent ratios of power consumed by each component in a receiver circuit in FIG. 3 and the receiver circuit according to the first embodiment in FIG. 4.

FIG. 9 illustrates constituent ratios of power consumed by each component in the receiver circuit in FIG. 3 and the receiver circuit according to the first embodiment in FIG. 4.

In the receiver circuit illustrated in FIG. 3, the total of the power consumption of the VCO 21A of the PLL-LO 13 and the VCO 21B of the PLL-TEST 19 is 47.3 mW. The total of the power consumption of the frequency divider circuit 22A of the PLL-LO 13 and the frequency divider circuit 22B of the PLL-TEST 19 is 234 mW. The total of the power consumption of the PD 23A of the PLL-LO 13 and the PD 23B of the PLL-TEST 19 is 3.8 mW. The total of the power consumption of the reference signal source 20 is 11.4 mW. Thus, the frequency divider circuits 22A and 22B make up a sizable proportion of the sum total of power consumption.

In contrast to this, in the receiver circuit according to the first embodiment, the power consumption of the VCOs 31 and 41, the power consumption of the PDs 33 and 43, and the power consumption of the reference signal source 20 are respectively 47.3 mW, 3.8 mW, and 11.4 mW, which are the same as those in the receiver circuit illustrated in FIG. 3. The power consumption of the frequency divider circuit 32 is 117 mW, which is equal to half the total of the power consumption of the frequency divider circuits 22A and 22B illustrated in FIG. 3 because no frequency divider circuit is provided in the PLL-TEST 40. On the other hand, the power consumptions of the mixer 42 and the reference frequency divider circuit 45 which are newly included in the PLL-TEST 40 according to the first embodiment are respectively 0 mW and 1.5 mW. Hence, the sum total of power consumption in the circuit illustrated in FIG. 3 is 296.5 mW, whereas the sum total of power consumption in the circuit according to the first embodiment is 181 mW, and thus the power consumption is significantly reduced.

Figure 10:
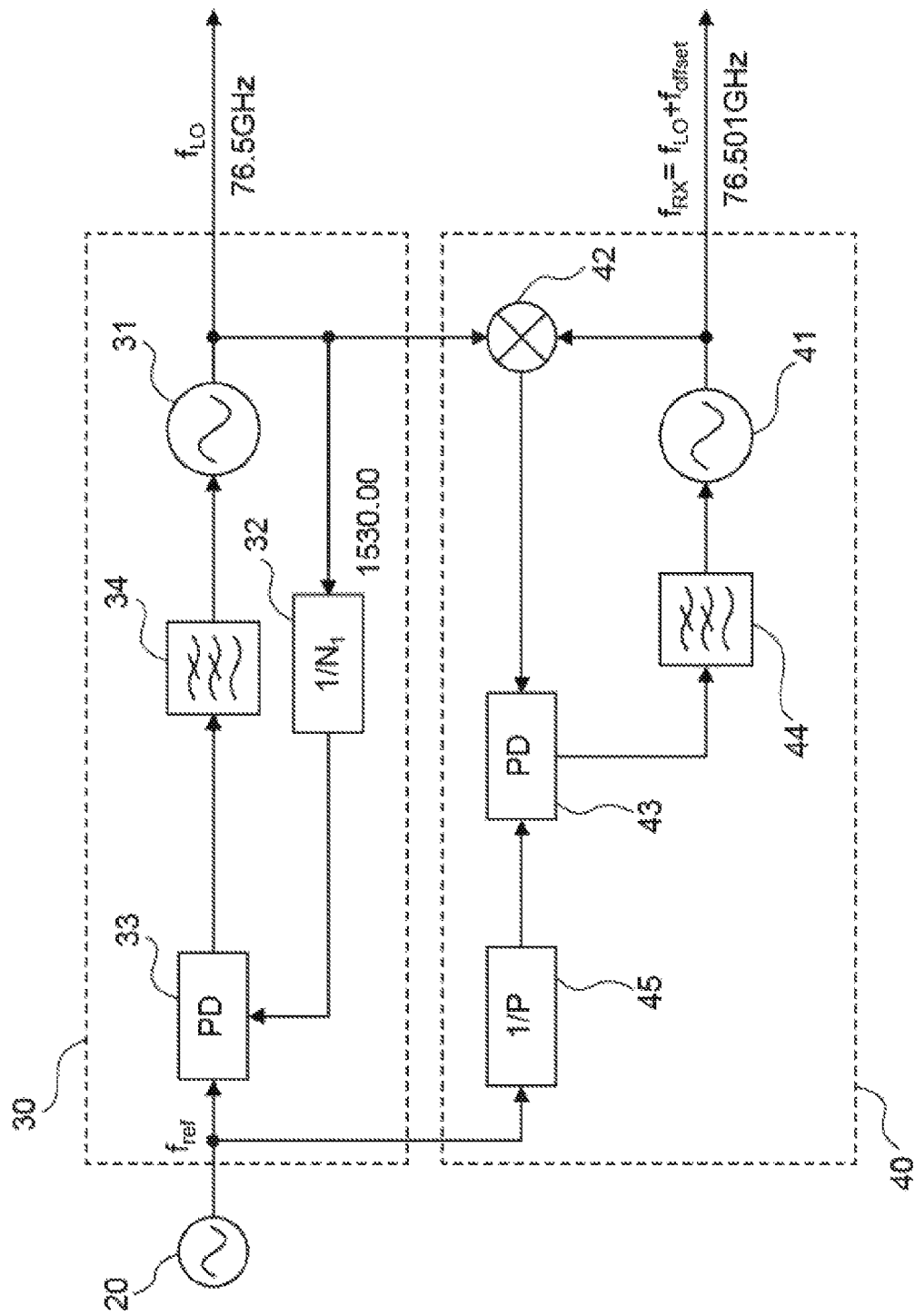
FIG. 10 is a circuit diagram illustrating configurations of a local signal generation circuit (PLL-LO) and a test signal generation circuit (PLL-TEST) in a receiver circuit according to a second embodiment.

FIG. 10 is a circuit diagram illustrating configurations of a local signal generation circuit (PLL-LO) and a test signal generation circuit (PLL-TEST) in a receiver circuit according to a second embodiment.

The receiver circuit according to the second embodiment is used as a receiver circuit of a wireless device like that illustrated in FIG. 2. The receiver circuit according to the second embodiment has the same configuration as that of the first embodiment except that the reference frequency divider circuit 45 divides a frequency $f_{ref}$ of an original reference signal Ref output by the reference signal source 20.

As described above, a frequency-divided signal output by the frequency divider circuit 32 of the PLL-LO 30 has a frequency which is equal to the frequency $f_{ref}$ of the original reference signal Ref output by the reference signal source 20, and, when a feedback loop is stabilized, their phases also match each other. Hence, the original reference signal Ref may be used in place of a frequency-divided signal.

The receiver circuit according to the second embodiment exhibits an effect similar to that in the first embodiment.

Figure 11:
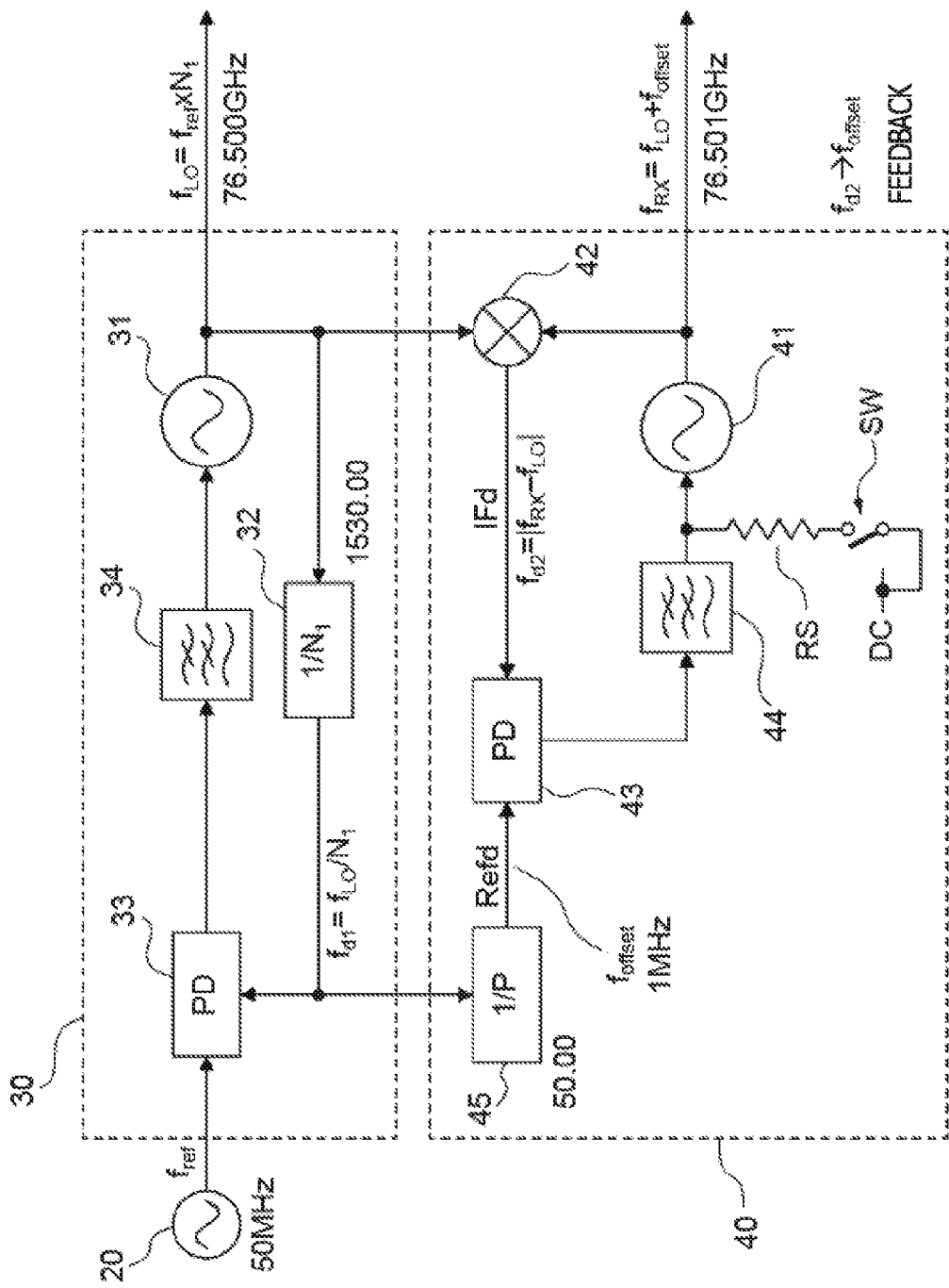
FIG. 11 is a circuit diagram illustrating configurations of a local signal generation circuit (PLL-LO) and a test signal generation circuit (PLL-TEST) in a receiver circuit according to a third embodiment.

FIG. 11 is a circuit diagram illustrating configurations of a local signal generation circuit (PLL-LO) and a test signal generation circuit (PLL-TEST) in a receiver circuit according to a third embodiment.

The receiver circuit according to the third embodiment has the same configuration as the receiver circuit according to the first embodiment except that an initialization circuit is provided at an output of the filter 44 of the test signal generation circuit (PLL-TEST) 40.

In the first and second embodiments, a frequency of a test signal is able to be offset with respect to a frequency of a local signal, that is, an absolute value of a frequency difference between the local signal and the test signal has to be $f_{offset}$. For this reason, the test signal may be stabilized at both a frequency on a high-frequency side and a frequency on a low-frequency side with respect to the frequency of the local signal. In other words, which side an output frequency of the test signal is stabilized on depends on a circuit initial state, and thus there is uncertainty.

In the third embodiment, an output from the filter 44, that is, a control voltage for the VCO 41 is set at a level on one potential side by the initialization circuit, and its state is changed to a stable state, thereby resulting in stabilization in one of low-frequency and high-frequency states.

In FIG. 11, the initialization circuit connects a signal line connecting the output of the filter 44 to an input of the VCO 41 to a high-potential power line via a resistor RS and a switch SW. When a predetermined time period has elapsed since the start of operation, the switch SW is put into an open state. Thus, in an initial state, a control voltage is set at a level on a high-potential side, an oscillation frequency of the VCO 41 is an upper limit frequency, feedback control results in a frequency $f_{RX}$ of a test signal in a stable state represented by $f_{RX}=f_{LO}+f_{offset}$, and the frequency of the test signal is located on a high-frequency side with respect to a frequency of a local signal.

In an example illustrated in FIG. 11, although the initialization circuit is constituted by the resistor RS and the switch SW, if the resistance of the resistor RS is increased, the switch SW does not have to be provided. Subsequently, a feedback loop moves toward stabilization, and, since the feedback loop moves toward stabilization from the high-frequency side, stability is achieved at a frequency offset to the high-frequency side with respect to the frequency of the local signal.

Additionally, in FIG. 11, if the signal line connecting the output of the filter 44 to the input of the VCO 41 is connected to a low-potential power line via the resistor RS and the switch SW, a frequency of a test signal is located on a low-frequency side with respect to a frequency of a local signal.

Furthermore, to enable switching between a high-frequency side and a low-frequency side on which a frequency of a test signal is set with respect to a frequency of a local signal, the signal line is connected to both a high-potential power line and a low-potential power line via two sets of the resistor RS and the switch SW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiver circuit, comprising:
   a local signal generation circuit that generates a local signal; and
   a test signal generation circuit that generates a test signal having a frequency close to a frequency of the local signal,
   wherein the test signal generation circuit includes
   an oscillator that generates the test signal,
   a mixer that mixes the local signal with an output of the oscillator to generate a low-frequency signal which is a difference signal between the local signal and the output of the oscillator,
   a phase detector that detects a phase difference between the low-frequency signal output by the mixer and a reference signal, and
   a filter that extracts a low-frequency component from an output of the phase detector, and controls an oscillation frequency of the oscillator by using an output of the filter,
   wherein the local signal generation circuit performs feedback control in accordance with a phase comparison result between a local frequency-divided signal obtained by dividing the frequency of the local signal and an original reference signal, and
   wherein the reference signal is a signal obtained by dividing a frequency of the local frequency-divided signal further.

2. A receiver circuit, comprising:
   a local signal generation circuit that generates a local signal; and
   a test signal generation circuit that generates a test signal having a frequency close to a frequency of the local signal,
   wherein the test signal generation circuit includes
   an oscillator that generates the test signal,
   a mixer that mixes the local signal with an output of the oscillator to generate a low-frequency signal which is a difference signal between the local signal and the output of the oscillator,
   a phase detector that detects a phase difference between the low-frequency signal output by the mixer and a reference signal, and
   a filter that extracts a low-frequency component from an output of the phase detector, and controls an oscillation frequency of the oscillator by using an output of the filter,
   wherein the local signal generation circuit performs feedback control in accordance with a phase comparison result between a local frequency-divided signal obtained by dividing the frequency of the local signal and an original reference signal, and
   wherein the reference signal is a signal obtained by dividing a frequency of the original reference signal.

3. A receiver circuit, comprising:
   a local signal generation circuit that generates a local signal; and
   a test signal generation circuit that generates a test signal having a frequency close to a frequency of the local signal,
   wherein the test signal generation circuit includes
   an oscillator that generates the test signal,
   a mixer that mixes the local signal with an output of the oscillator to generate a low-frequency signal which is a difference signal between the local signal and the output of the oscillator,
   a phase detector that detects a phase difference between the low-frequency signal output by the mixer and a reference signal, and
   a filter that extracts a low-frequency component from an output of the phase detector, and controls an oscillation frequency of the oscillator by using an output of the filter,
   wherein the test signal generation circuit includes an initialization circuit that initializes the frequency of the test signal output by the oscillator to one of a low frequency and a high frequency with respect to the frequency of the local signal.

* * * * *